United States Patent [19]

An et al.

[11] Patent Number: 4,987,208

[45] Date of Patent: Jan. 22, 1991

[54] MELT PROCESSABLE WHOLLY AROMATIC POLYESTER

[75] Inventors: Tae W. An; Jong K. Jung; Yung C. Yoo; Pil H. Lee; Tae W. Son, all of Seoul, Rep. of Korea

[73] Assignees: Tong Yang Nylon Co., Ltd; Tong Yang Polyester Co., Ltd., both of Rep. of Korea

[21] Appl. No.: 392,571

[22] Filed: Aug. 11, 1989

[30] Foreign Application Priority Data

Feb. 24, 1989 [KR] Rep. of Korea .................. 892167

[51] Int. Cl.$^5$ .................. C08G 63/00; C08G 63/02
[52] U.S. Cl. .................. 528/272; 528/176; 528/193; 528/271
[58] Field of Search ............ 528/176, 193, 271, 272

[56] References Cited

PUBLICATIONS

"Poly(arylene ethers).", P. M. Hergenrother et al., Langley Res. Center, NASA, (1987).
"Thermal Degradation of Aromatic Copolyesters by Pyrolysis-Gas Chromatography", Sui, Weimin et al., Journal of East China Inst. Textile Science and Tech.

*Primary Examiner*—Harold D. Anderson
*Assistant Examiner*—T. Mosley
*Attorney, Agent, or Firm*—Leydig, Voit & Mayer

[57] ABSTRACT

The present invention relates to a melt processable wholly aromatic polyester which includes the recurring moieties (I), (II), (III), and (IV), wherein the recurring moiety (IV) is present in an amount of 5 to 35 mole % based on the total amount of the moieties and can be subjected to melt process at a temperature below 350°:

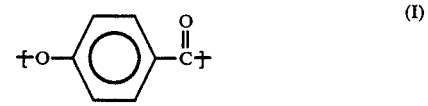

(I)

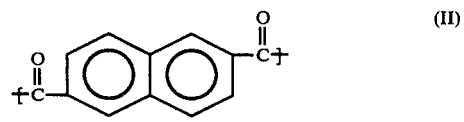

(II)

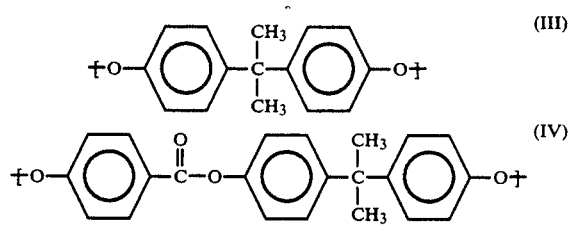

(III)

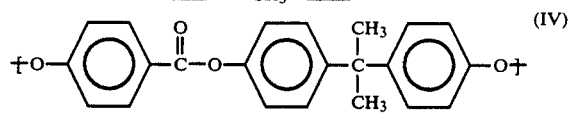

(IV)

6 Claims, No Drawings

MELT PROCESSABLE WHOLLY AROMATIC POLYESTER

DETAILED DESCRIPTION OF INVENTION

The present invention relates to a wholly aromatic polyester having an excellent melt processability.

Generally, since polyesters have good physical properties, these polyesters have been widely used to produce fibers, films, molding articles and the like. Particularly, since heat resistance, mechanical properties and the like of wholly aromatic polyesters are superior to those of conventional polyesters, wholly aromatic polyesters have been used for molding articles which require heat resistance, flame retardance, mechanical properties and the like.

Such wholly aromatic polyesters often have a low molecular weight and a relatively high melting point, and are readily decomposed at a temperature below their melting points. Therefore, it is very difficult to produce high polymers which have good mechanical properties. Furthermore, these polymers are difficult to use since they are difficult to process these polymers. In order to overcome such problems, various wholly aromatic polyesters have been proposed.

For example, U.S. Pat. Nos. 3,656,994; 3,759,870; 3,767,621; 3,829,406; 3,975,487; 4,542,203 and 4,560,740, Great Britain Patent Nos. 2058102, 2124236 and 2150580 disclose the introduction of derivatives such as 4,4'-biphenol as an aromatic diol, U.S. Pat. Nos. 3,778,410; 3,804,805; 4,140,846; 4,153,779 and 4,181,792 disclose the use of an aliphatic alcohol as a diol, and U.S. Pat. Nos. 4,067,852; 4,130,545; 4,161,470; 4,184,996; 4,188,476; 4,219,461; 4,224,433; 4,279,803; 4,299,756; 4,337,190; 4,375,530; 4,393,191; 4,421,908; 4,429,100; 4,431,770; 4,473,682 and 4,581,399 disclose the use of naphthalene derivatives such as naphthalene diol, naphthalene dicarboxylic acid, hydroxy naphthalene carboxylic acid and the like. However, since aromatic polyesters prepared by the above methods have a low molecular weight or high melting point and/or irregularity of the recurring units at the time of polymerization, these polymers do not have uniform properties.

Therefore, it is an object of the present invention to provide a wholly aromatic polyester, which does not have conventional defects and which may be subjected to meltting at a temperature of below 350° C.

It is another object of the present invention to provide a wholly aromatic polyester wherein the polymer has uniform properties by maintaining the regularity of the recurring units in the polymer.

Hereinafter, the present invention will be illustrated in more detail. The present invention is directed to a wholly aromatic polyester, characterized in that it comprises the recurring moieties (I), (II), (III) and (IV), wherein the recurring moiety (IV) is present in an amount of 5 to 35 mole % based on the total amount of the moieties, and may be subjected to melting at a temperature of below 350° C.

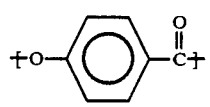 (I)

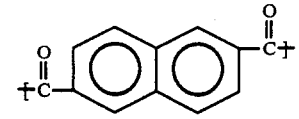 (II)

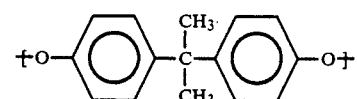 (III)

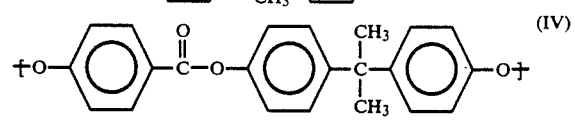 (IV)

In the present invention, it is preferred that the moiety of structural formula (III) consists of 5 to 40 mole % based on the total amount of moieties used for producing the wholly aromatic polyester. In addition, the amount of the moiety (II) is the same as that of moiety (III) or may exceed that amount in view of the loss during the reaction, and the appropriate amount is 5 to 50 mole % based on the total amount of moieties used.

If the amount of the moieties (II) and (III) exceeds the above range, or the polymer of the present invention does not include the recurring moiety (IV) in the total recurring units of the polymer, the resulting polyester does not have a thermotropic melt phase and also has a higher melting point which makes it difficult to prepare or process.

Accordingly, the wholly aromatic polyester of the present invention may be prepared by a method which produces a polymer containing the recurring moieties (I), (II), and (III) as essential moieties and including essentially the moiety (IV) in the recurring units of final polymer, and acetate, lower alkyl ester and phenyl ester of aromatic ring may be used as initial starting materials.

The moiety (III) includes 4,4'-biphenol, hydroquinone, resorcinol, 1,1'-thio-4,4'-biphenol, naphthalene-1,5-diol, naphthalene-2,6-diol, naphthalene-2,7-diol, 3,3'-biphenol, compounds in which an aromatic ring of diol is substituted by halogen atoms, lower alkyl radical or lower alkoxy radical, and acetate, lower alkyl ester and phenyl ester of diols.

The polycondensation reaction of the starting materials can be carried out by using a known ester internal variation catalyst in the amount of 0.001 to 1% by weight, preferably 0.01 to 0.2% by weight on the basis of the total amount of the starting materials.

Ester internal variation catalysts include dialkyl tin oxide, diaryl tin oxide, titanium dioxide, titanium alkoxide, alkoxy titanium silicates, alkali metal or alkali earth metal carboxylates, gaseous catalyst, Lewis acids such as BF and hydrogen halides such as hydrogen chloride.

The wholly aromatic polyester according to the present invention may be obtained from a known random copolymer, block copolymer or highly homogeneous copolymer. When polymerization is carried out by using a method known in the relevant art, the reaction may be carried out at a temperature of 150° to 400° C., particularly preferably 250° to 350° C. In order to remove volatile by-products such as acetic acid, water, alcohol and phenol which were formed at the final stage of polycondensation, vacuum treatment may be applied at the end of the reaction.

It is preferable that the moiety (IV) should be included in the recurring units of the wholly aromatic polyester of the present invention by applying the following polymerization:

Synthesis of the monomer containing moiety (IV)

To a three neck flask equipped with a stirrer, distiller and nitrogen gas inlet, p-hydroxybenzoic acid and bisphenol A diacetate were added in the same molar ratio, and then the mixture was slowly warmed under a nitrogen gas stream while stirring. The temperature of the mixture was increased from room temperature to 150° C. over about 1 hour. After stirring for 30 minutes at 150° C., the temperature was increased to 230° through 250° C. at the rate of 1° C. per minute, and then acetic acid, a by-product, was discharged through the distiller.

When 95% above of theoretical amount of acetic acid based on the added p-hydroxybenzoic acid was discharged, the reactor was cooled to normal temperature, and then 100 to 500%, preferably 150 to 400% of acetic anhydride, based on the molar ratio of the added p-hydroxybenzoic acid, was added. The mixture was heated to 150° C., and refluxed for 2 hours to synthesize the following monomer containing moiety (IV).

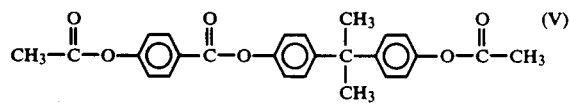

The structure of the monomer (V) containing moiety (IV) was determined by using NMR and IR, and it appeared that since the reactivity of the —COOH group and the

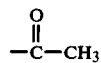

group of bisphenol A diacetate was superior to that of the —OH group of p-hydroxybenzoic acid, self-condensation of p-hydroxybenzoic acid did not occur.

Synthesis of Processable Aromatic Polymer

To a three neck flask equipped with a stirrer, distillation head and nitrogen gas inlet tube, monomer (V) containing moiety (IV), p-acetoxybenzoic acid, naphthalene-2,6-dicarboxylic acid and bisphenol A diacetate were added, the mixture was heated to 330° to 350° C. under a nitrogen stream with stirring, while adjusting the heating rate with 1° C. per miniute at 200° C.

While heating the mixture, 90 mole % of the theoretical amount of acetic acid was discharged, and the reaction system was pressure-reduced to 0.1 torr for 15 minutes at the same temperature, and was reacted further for 30 minutes to obtain a wholly aromatic polyester of the present invention. By using the same procedure, a wholly aromatic polyester, which essentially contains the moieties (I), (II) and (III), includes 5 to 35 mole % of moiety (IV) based on the total recurring units of polymer, and may be subjected to melt process at the temperature of below 350° C., can be obtained, and the moiety (III) consists of 5 to 40 mole % of the total amount of the moieties used.

The wholly aromatic polyester obtained by the present invention has optical anisotropy and an intrinsic viscosity of above 0.3, preferably above 0.7. The intrinsic viscosity, which can be calculated from the following equation, can be measured by dissolving the resulting wholly aromatic polyester in a solution of 0.4% by weight of concentration of phenol/1,1,2,2-tetrachloroethane (60/40% by weight).

$$\eta_{inh} = \frac{\ln(R.V.)}{C}$$

wherein,
C represents concentration, and
R.V. represents relative viscosity.

The optical anisotropy may be determined by melting the wholly aromatic polyester with a Leitz heating apparatus and using Leitz polarizing microscope (×100).

The viscosity of the wholly aromatic polyester according to the present invention may be increased by solid phase polymerization. For example, the fibers, or particularly articles, are preferably thermally treated in an inert atmosphere (e.g., nitrogen, argon, helium) or reduced pressure, with or without stress, at a temperature below the polymer melting point until the desired viscosity enhancement is achieved. Thermal treatment times commonly range from a few minutes to several days. The wholly aromatic polyester according to the present invention may be used to produce fibers, films and various molded articles. The fibers are useful for tire cords, and also may be used for conveyor belts, hose cables and resin-reinforced materials. The films may be used for packaging tape, cable packages, magnetic tape and electrical insulating film. Molded articles may be used for machine parts, electron oven components and ovenware.

The following examples are presented as specific illustrations of the claimed invention. It should be understood, however, that the invention is not limited to the specific details set forth in the examples.

EXAMPLE 1

To a 300 ml three neck flask equipped with a stirrer, distillation head and nitrogen gas inlet tube, 17.28 g (0.04 mole) of a monomer containing moiety (IV), 46.8 g (0.26 mole) of p-acetoxy benzoic acid, 17.28 g (0.08 mole) of naphthalene-2,6-dicarboxylic acid and 12.48 g (0.04 mole) of bisphenol-A diacetate were added, and then the mixture was heated to 150° C. for 1 hour under a nitrogen stream with stirring. At the same temperature, mixture was then heated to 200° C. at the rate of 1 C.° per minute, stirred for 30 minutes, and then heated to 350° C. at the rate of 1 C.° per minute with stirring.

During this reaction, 95% (24.2 ml) of the theoretical amount of acetic acid was discharged. The pressure was reduced to 0.1 torr for 15 minutes, and then reaction was continued for an additional 30 minutes at 350° C. under 0.1 torr to give a polymer product. The product was cooled to room temperature, and then freezer milled with liquid nitrogen.

The resultant polymer had an intrinsic viscosity of 0.402, a melting point measured at 20° C. by using a Differential Scanning Calorimeter (DSC) of 322° C., and a 5% decomposition temperature measured with Thermogravimetric Analyzer (TGA) of 452° C.

EXAMPLE 2

To the reactor used in Example 1, 28.08 g (0.065 mole) of monomer containing moiety (IV), 27.9 g (0.155 mole) of p-acetoxybenzoic acid, 24.84 g (0.115 mole) of naphthalene-2,6-dicarboxylic acid and 15.6 g (0.05 mole) of bisphenol A diacetate were added, and then the mixture was heated to 150° C. for 1 hour under a nitrogen stream with stirring.

At the same temperature, the mixture was heated to 200° C. at the rate of 1 C.° per minute, stirred for 30 minutes, and then heated to 330° C. at the rate of 1 C.° per minute with stirring. During this procedure, 21.5 ml (93% of theoretical amount) of acetic acid was discharged. The pressure was reduced to 0.1 torr for 15 minutes, and then the mixture was reacted for an additional 30 minutes to give a polymer.

The product was cooled to room temperature, and then freeze milled under liquid nitrogen. The resulting polymer had an intrinsic viscosity of 0.416, a melting point measured by DSC of 305° C., and a 5% decomposition temperature measured by TGA of 436° C.

COMPARISION EXAMPLE 1

To the reactor used in Example 1, 48.6 g (0.27 mole) of p-acetoxy benzoic acid, 35.88 g (0.115 mole) of bisphenol A diacetate and 24.84 g (0.115 mole) of naphthalene-2,6-dicarboxylic acid were added, the mixture was then heated to 150° C. for 1 hour under a nitrogen stream with stirring. After stirring the mixture at the same temperature for 30 minutes, the mixture was heated to 210° C. at the rate of 1 C.°/min, stirred for 1.5 hours at the same temperature and then heated to 330° C. at the rate of 1 C.°/min while passing a nitrogen stream therethrough.

28.8 ml (96% of theoretical amount) of acetic acid was separated in this procedure.

The pressure was reduced to 0.1 torr for 15 minutes, and then the mixture was heated for 30 minutes to give a polymer. The resulting product was cooled to room temperature, and freeze milled with liquid nitrogen. The intrinsic viscosity of the resulting polymer was 0.432 and the 5% decomposition temperature measured by TGA was 433° C. The melting temperature of the resulting polymer was not measured by DSC.

EXAMPLE 3

To the reacting vessel used in Example 1, 38.88 g (0.09 mole) of monomer containing moiety (IV), 19.8 g (0.11 mole) of p-acetoxybenzoic acid, 28.0 g (0.13 mole) of naphthalene-2,6-dicarboxylic acid and 12.48 g (0.04 mole) of bisphenol A diacetate were added, and the mixture was heated to 150° C. for 1 hour under a nitrogen stream with stirring.

From this temperature, the mixture was heated to 210° C. at the rate of 1 C.°/min., stirred for 30 minutes, and heated to 350° C. at the rate of 1 C.°/min while stirring 21.3 ml (96% of theoretical amount) of acetic acid was separated in this stage. The pressure was decreased to 0.1 torr for 15 minutes, and then the mixture was reacted at 0.1 torr for 45 minutes to give a polymer.

The reactant polymer was cooled to room temperature, and freeze milled under liquid nitrogen. The intrinsic viscosity of the resulting polymer was 0.792, the melting point measured by DSC was 291° C., and the 5% decomposition temperature measured by TGA was 425° C.

EXAMPLE 4

Applying the same conditions and procedures described in Example 2, 47.52 g (0.11 mole) of monomer containing moiety (IV), 9.0 g (0.05 mole) of p-acetoxybenzoic acid, 32.4 g (0.15 mole) of naphthalene-2,6-dicarboxylic acid and 12.48 g (0.04 mole) of bisphenol A diacetate were used to obtain the polymer. Before the pressure-reducing step, 19.7 ml (94% of theoretical amount) of acetic acid was discharged. The intrinsic viscosity of the resulting polymer was 0.472, the melting temperature measured by DSC was 272° C. and the 5% decomposition temperature measured by TGA was 412° C.

COMPARISION EXAMPLE 2

Applying the same conditions and procedures described in Example 2, 73.44 g (0.17 mole) of monomer containing moiety (IV) and 36.72 g (0.17 mole) of naphthalene-2,6-dicarboxylic acid were used to obtain the polymer. Before the pressure-reducing step, 18.8 ml (92% of theoretical amount) of acetic acid was separated. The intrinsic viscosity of the resulting polymer was 0.452, and the 5% decomposition temperature measured by TGA was 402° C. The melting temperature of the resulting polymer was not measured by DSC.

We claim:

1. A melt processable wholly aromatic polyester which is melt processable at a temperature below 350° C. comprising the recurring moieties (I), (II), (III) and (IV), wherein the recurring moiety (IV) is present in an amount of 5 to 35 mole %, based on the total amount of the moieties:

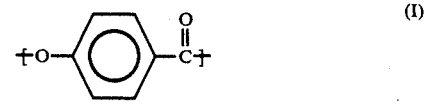

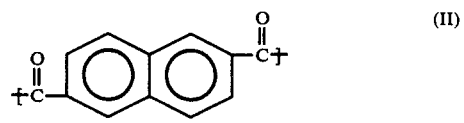

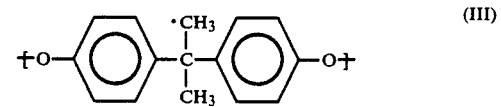

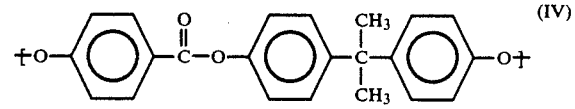

2. A melt processable wholly aromatic polyester as claimed in claim 1, wherein the recurring moiety (III) comprises 5 to 40 mole % of the total amount of moieties used to form the wholly aromatic polyester.

3. A melt processable wholly aromatic polyester as claimed in claim 1, wherein the recurring moiety (II) comprises 5 to 50 mole % of the total amount of moieties used to form the wholly aromatic polyester.

4. A process for preparing a melt processable wholly aromatic polyester claimed in claim 1, comprising polymerizing each of the monomers having recurring moieties (I), (II), (III) and (IV) at a temperature of 150° C. under a nitrogen gas atmosphere and heating the resulting mixture from about 200° C. to about 350° C. at a rate of 1 C.° per minute.

5. A process for preparing a melt processable wholly aromatic polyester as claimed in claim 4 wherein the recurring moiety (III) comprises 5 to 40 mole % of the total amount of moieties used to form the wholly aromatic polyester.

6. A process for preparing a melt processable wholly aromatic polyester as claimed in claim 4 wherein the recurring moiety (II) comprises 5 to 50 mole % of the total amount of moieties used to form the wholly aromatic polyester.

* * * * *